(12) United States Patent
Mizes et al.

(10) Patent No.: US 7,295,349 B2
(45) Date of Patent: Nov. 13, 2007

(54) SYSTEMS AND METHODS FOR COMPENSATING FOR PRINT DEFECTS

(75) Inventors: Howard A. Mizes, Pittsford, NY (US); R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 967 days.

(21) Appl. No.: 10/458,427

(22) Filed: Jun. 11, 2003

(65) Prior Publication Data

US 2004/0252905 A1 Dec. 16, 2004

(51) Int. Cl.
*G06K 9/40* (2006.01)

(52) U.S. Cl. .............. 358/3.26; 358/1.9; 382/254; 382/272; 382/221; 382/310; 382/274; 382/276; 382/270

(58) Field of Classification Search .......... 358/1.9, 358/3.26; 382/272, 254, 221, 310, 374, 274, 382/276, 270

See application file for complete search history.

(56) References Cited

U.S. PATENT DOCUMENTS 5,519,497 A 5/1996 Hubble, III et al.
5,982,946 A * 11/1999 Murakami .................. 382/272

* cited by examiner

*Primary Examiner*—King Y. Poon
*Assistant Examiner*—Quang N. Vo
(74) *Attorney, Agent, or Firm*—Oliff & Berridge, PLC

(57) ABSTRACT

Diminished intensity defects occur in electrostatic printing between image regions having grey levels, i.e., different electrostatic potential and toner densities. Such defects occur when higher density regions "steal" toner from lower density regions. The system and methods according to this invention compensate for these defects by modifying the input image data. The input image data in lighter regions that precede or occur near a light-to-dark transition to a dark region are raised above the input image values. Thus, when printed, the printed image intensity values in such regions are higher than the corresponding image intensity values. As a result, when the higher density regions steal the extra toner provided due to the raised values, the gray level of the printed image corresponds to the desired gray level. The magnitude of these defects is periodically measured with a calibration pattern to generate and/or update compensation factors used in the compensation process.

10 Claims, 16 Drawing Sheets

NUMBER OF SCANLINES FROM EDGE

SYSTEMS AND METHODS FOR COMPENSATING FOR PRINT DEFECTS

BACKGROUND OF THE INVENTION

1. Field of Invention

This invention relates to systems and methods for reducing print defects in electrostatically formed images.

2. Description of Related Art

The electrophotographic printing process is well known. Typically, electrostatic imaging and printing processes include several distinct stages. These stages typically include some or all of (1) charging, (2) exposing, (3) developing, (4) transferring, (5) fusing, and (6) cleaning. An electrophotographic printing system typically includes a printer or a marking engine. The printer or marking engine may include a photoconductive belt or drum as a photoconductive surface.

In the charging stage, a uniform electrical charge is uniformly deposited on the surface of the photoconductive belt or drum to electrostatically sensitize the photoconductive surface. The electrophotographic exposing stage includes rotating or moving the charged photoconductive surface to an exposure station, where the charged portion of the photoconductive surface is exposed to light from, for example, a scanning laser beam. By modulating the light beam, an electrostatic latent image of variable electrostatic potential is recorded on the photoconductive surface. The light beam is modulated with an input serial image information stream so that individual picture elements or pixels of the image represented by the data stream are exposed on the photoreceptor to form the latent image.

The electrophotographic developing stage uses a developer material, such as a toner powder, which is attracted to the latent image in varying densities depending varying electrostatic potential of the latent image. In the transferring and fusing stages, the toner powder image is transferred to a copy sheet, and finally the toner powder image is heated and/or pressed to permanently fuse the powder image to the copy sheet in the image configuration. In the electrophotographic cleaning stage, the photoconductive surface of toner is cleaned and the charge images are discharged so that the process can be reliably repeated.

SUMMARY OF THE INVENTION

Defects in the scanning and printing process can arise from one or more of the stages described above. Defects may occur in the development stage, where parts of the processed image will have regions of diminished toner density. Such regions of diminished intensity tend to occur in electrostatic printing at an interface of two objects of an image having different gray levels, and therefore different electrostatic potential and toner densities. The object that would result in a higher toner density can "steal" toner from the region that would result in a lower toner density, creating a toner "starvation" or "white space" defect.

The electrostatic latent image passes serially through the development process. Some images may contain features that have a darker solid region on top of a lighter solid region. The lead edge of the dark solid is the edge that passes first through the development stage. The trail edge of a dark solid is the edge that passes last through the development state.

The white space can occur either on the lead edge of the interface, the trail edge of the interface, or both. The physical cause can be different for lead edge white space and trail edge white space. Therefore, the magnitude of the white space can be different on the lead edge and the trail edge.

This invention provides systems and methods that compensate for the white space defect.

This invention additionally provides systems and methods that modify the input image pixel densities or gray level of the input image to compensate for the white space defect.

This invention separately provides systems and methods that measure the magnitude of a diminished toner density region or white space defect.

This invention additionally provides systems and methods that measure the magnitude of the white space defect using one of several existing toner area coverage sensors and a calibration pattern.

This invention further provides systems and methods that measure the magnitude of the white space defect using a scanner and a calibration pattern.

This invention also provides systems and methods that measure the magnitude of the white space defect using a modified toner area coverage sensor and a calibration pattern.

This invention additionally provides systems and methods that measure the magnitude of the white space defect by creating, printing, scanning, and processing an image that is sensitive to the magnitude of the white space defect.

This invention separately provides systems and methods that generate compensation factors based on a measured magnitude of a diminished toner density region.

This invention separately provides systems and methods that use efficient image preprocessing to implement white space defect compensation.

In various exemplary embodiments, the systems and methods according to this invention compensate for the white space defect by modifying the input image pixel intensity and/or the input image bitmap. The input image intensity values in lighter regions that precede or occur near a light-to-dark transition to a dark object are raised above the input image intensity values. Thus, when printed, the printed image intensity values in such regions are higher than the corresponding image intensity values. As a result, the gray level of the printed image corresponds to the desired gray level. In various exemplary embodiments, the magnitude of the white space defect is periodically measured with a calibration pattern to generate and/or update compensation factors that are used in the compensation process. This is done at least once prior to image processing. In various exemplary embodiments, an approximate method for determining modified pixel intensity parameters is used which only requires the current scan line and an historical state be processed during the real time data flow.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The systems and methods according to this invention compensate for diminished toner density regions, also known as "starvation" defects and/or "white space" defects, arising at the interface of two adjacent objects of a printed image that have different intended gray levels. The formation of this diminished toner density region between two such objects may be caused by the physics of the electrostatic printing process, in particular the difference in charge or electrostatic potential, between the objects of different gray levels in the latent image on the photoreceptor.

Figure 17:
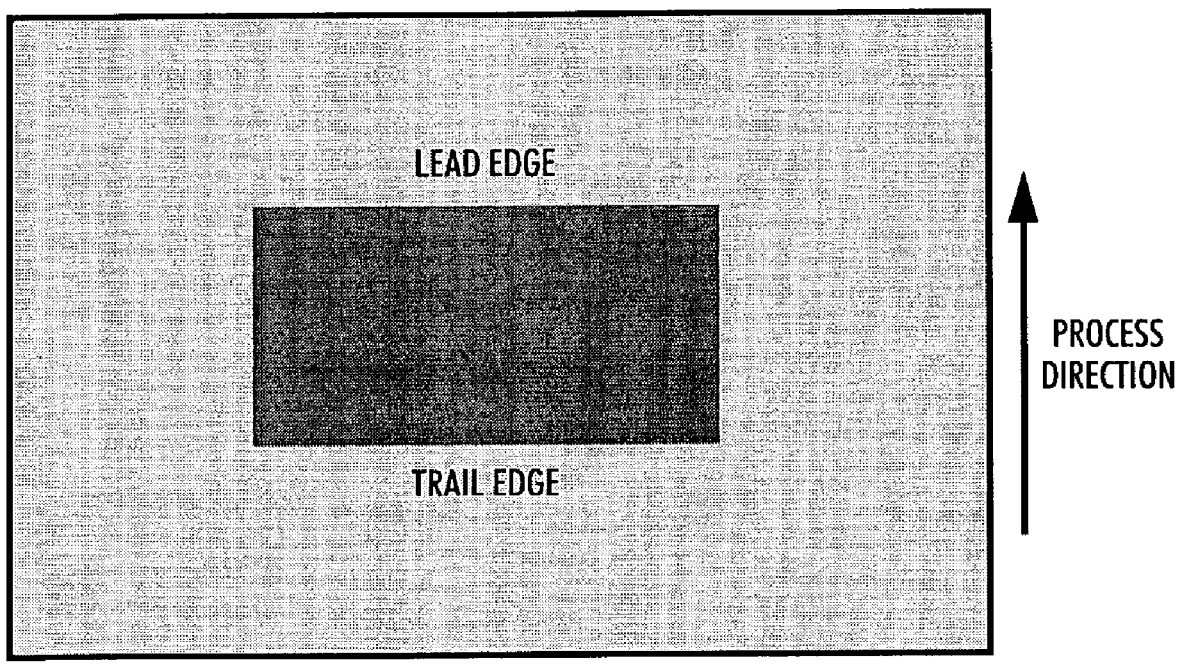
FIG. 17 illustrates the leading edge and the trailing edge of a solid.

In various exemplary embodiments, for example, when the lighter object is adjacent to, or otherwise near to, the leading edge of the darker object, as shown in FIG. 17, when the charged toner particles are brought into contact with the electrostatic image, the higher potential difference of the as yet undeveloped dark region causes some toner particles to "shift away" from the nearby lighter region as that lighter region is developed.

In another example, toner developing a dark image may deplete the supply of toner on the supply roll to some extent. At a trailing edge interface, such as that shown in FIG. 17, this depleted supply will develop the following, lighter-density image less efficiently and it will be lighter. As the supply roll turns, a more well supplied roll will develop the rest of the light gray area away from the interface and it will be darker than what was printed at the interface.

The decreased development efficiency at the interface results in a small "white space" or diminished toner density region in the lighter object. The diminished toner region is also known as a "starvation" defect. Often, the diminished toner density region may have a width of about 0.1 millimeter to about 3.0 millimeters.

This problem is not what is typically called halo in the offset process. In printing processes, halo usually refers to the white area that can appear between two adjacent regions of different colors when the color separation layers are misregistered. The misregistration problem can be solved with trapping, i.e., expanding the boundary of one color beyond what is digitally called for so it overlaps with the other color. The white space defect that is the focus of the systems and methods according to this invention appears in a single color separation. Trapping would not solve the white space defect; rather, the white space defect would just move along with the boundary.

Figure 1:
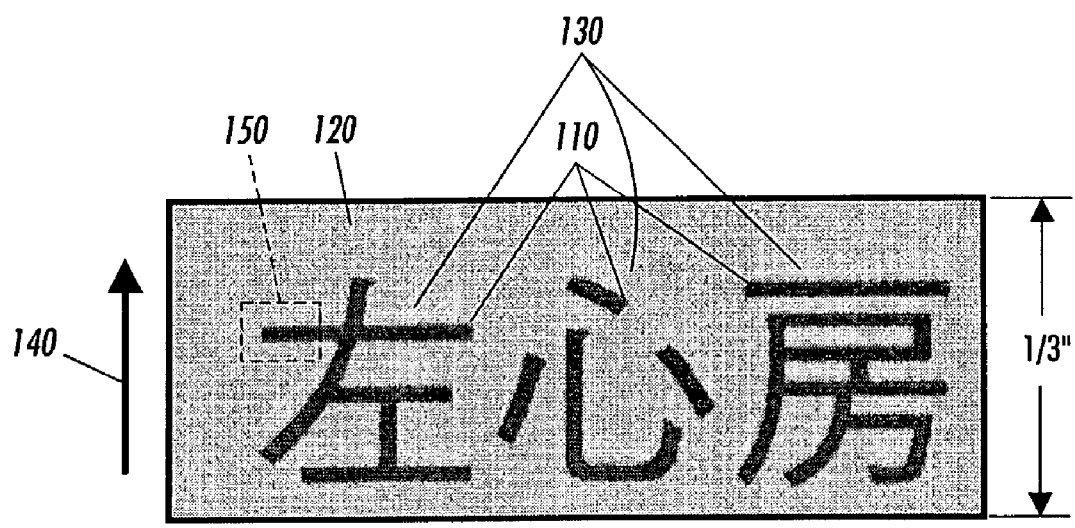
FIG. 1 is an example of an electrophotographically printed image that contains white space defect regions.

FIG. 1 illustrates one example of a printed halftone image that exhibits the "white space" or "starvation" defect. The Kani characters 110 shown in FIG. 1 are formed on a relatively lighter background 120. The process direction labeled with the arrow 140 is towards the top of the image. Thus, the top edges of the Kani characters 110 are developed first. As a result, "white spaces" 130 can be seen in the background 120 wherever the relatively lighter background 120 borders an upper edge of one of the relatively darker Kani characters 110.

Figure 2:
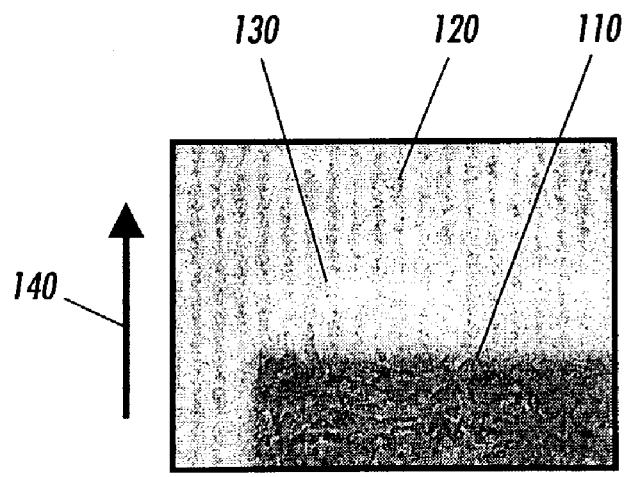
FIG. 2 is an enlarged example of one of the white space defects shown in FIG. 1.

FIG. 2 shows an enlarged version of the area 150 marked in FIG. 1. As shown in FIG. 2, the edge of the Kani character 110, which is a relatively dark object, has a high halftone density. In the background 120, which is a relatively light, low-half-tone density object, the 300-lpi-resolution line-screen used in the image can be seen. The "white space" or starvation defect region 130 is easily seen where the toner density of the halftone lines of the background 120 is diminished close to the top edge of the Kani character 110 or dark object.

It is believed that the white space defect occurs because the relatively lighter undeveloped object, in this case, the background 120, in the region above, i.e., prior relative to the process direction, the relatively darker undeveloped object, in this case, the Kani characters 110, is developed first. Consequently, at least some of the toner that was directed at the region 130 of the relatively lighter background 120 was more electrostatically attracted to the relatively-darker, as-yet undeveloped object 110. As a result, the toner that was to be used to sufficiently densely develop the area 130 instead developed the region 170. Thus, the area 130 is relatively starved of toner.

This occurs in regions where the electrostatic attraction of a first region, at the time a second region is developed, is sufficiently stronger than that of the second region to effectively steal toner from the second region. Accordingly, the defect does not occur, at least to the same degree or visibility, at the side or bottom edges of the Kani characters 110, because, at the time the surrounding portions of the background 120 that are close to those edges are developed, the relatively darker Kani characters are also being, or have been, developed, thus reducing the electrostatic attraction of the Kani characters 110 sufficiently that the Kani characters 110 generally do not steal, or steal only a little of, the toner destined for those regions the background 120.

Figure 3:
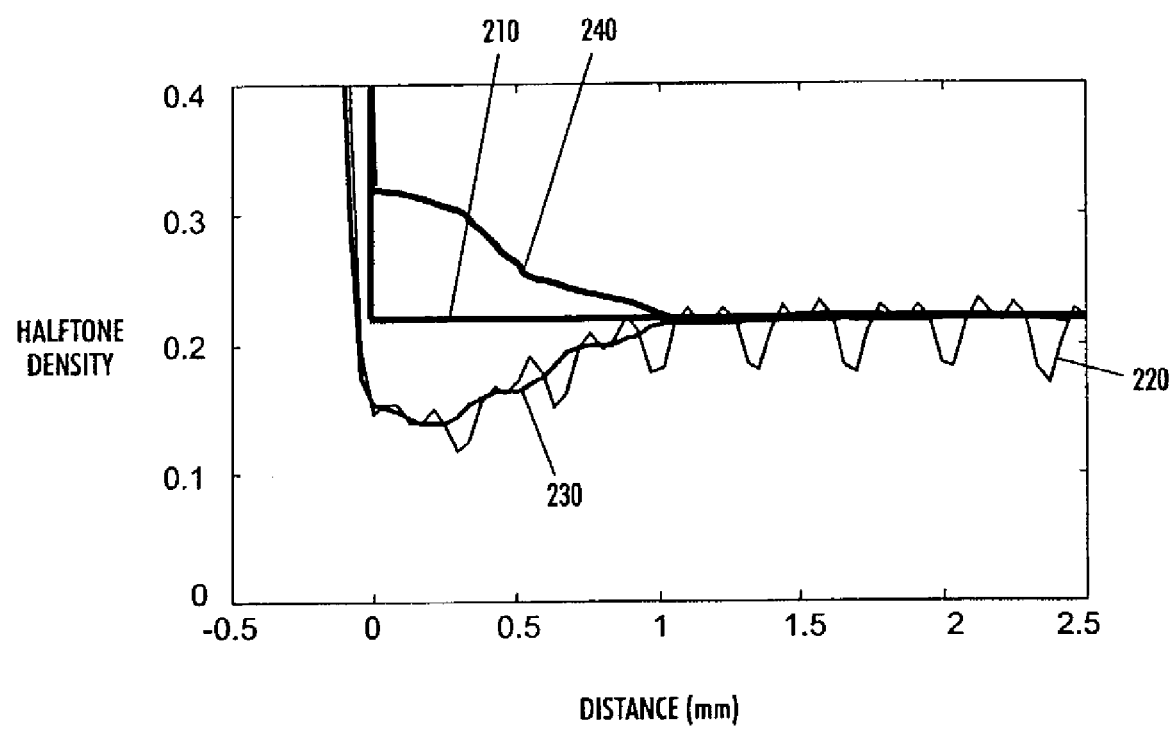
FIG. 3 is a graph illustrating input image gray level density, diminished toner density caused by the white space defect, and the modified gray level density, as a function of distance from the image object edge.
Figure 4:
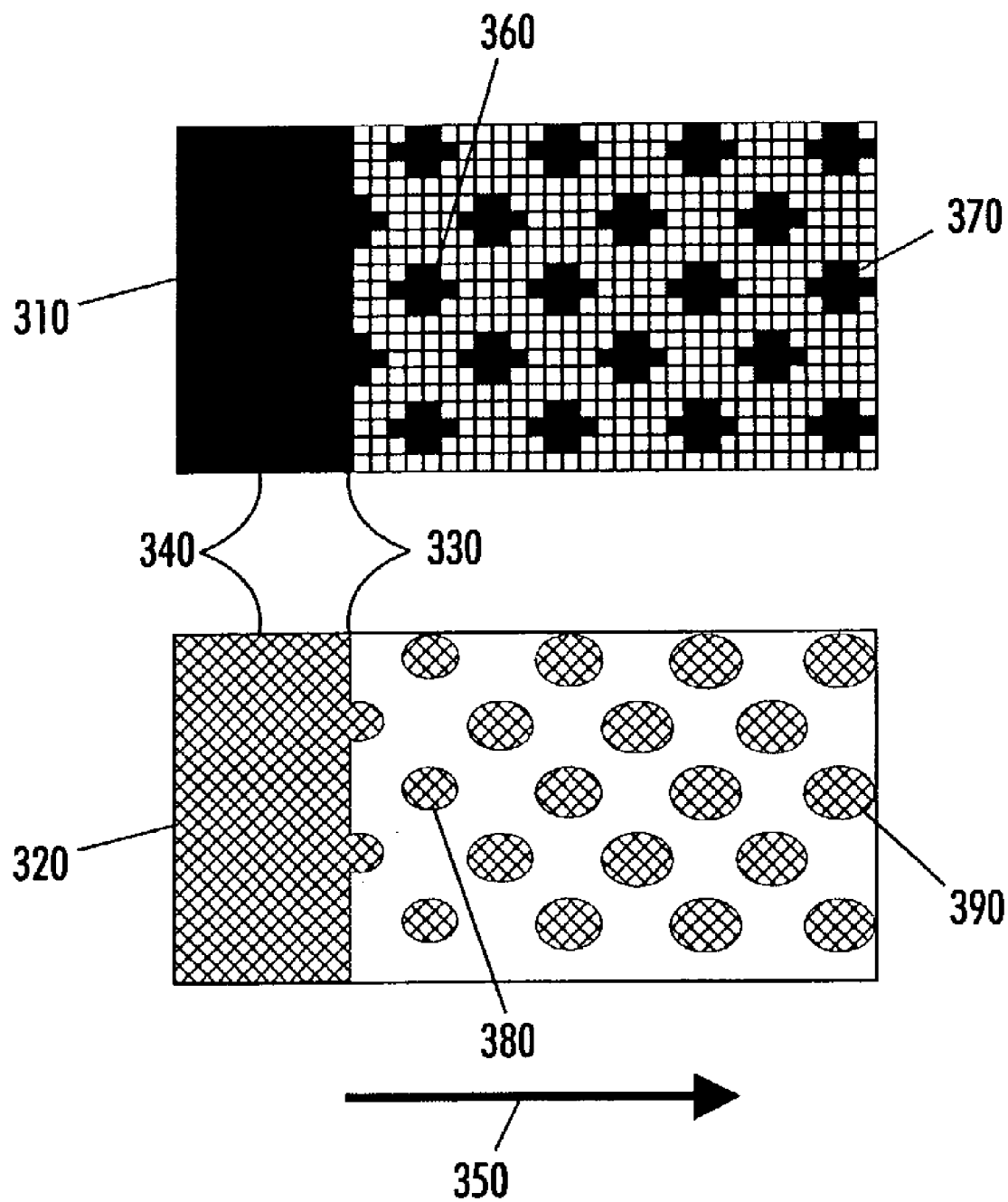
FIG. 4 illustrates an unmodified bitmap and corresponding halftone image produced from that bitmap having diminished toner density regions.

FIG. 3 is a graph showing several curves, which show the halftone density as a function of distance from an edge perpendicular to the process direction. FIG. 4 is an illustration of an uncompensated or unmodified bitmap 310 and the corresponding uncompensated or unmodified halftone image 320 produced from the uncompensated bitmap 310, which has an edge 330 between a dark object 340 on the left side of the edge and the halftone spots making up a lighter object on the right side of the edge. The arrow 350 shown in FIG. 4 indicates the process direction for this image. In this case, the arrow 350 indicates that the line of development moves from right to left, or that the latent image moves from left to right past a fixed developer unit, such that the areas from the right edge of the image are developed first.

The input image curve 210 shown in FIG. 3 indicates the desired halftone density of the input digital image. The region of the input image curve 210 at a distance between −0.5 mm to 0 mm represents a dark object and has a density of 1.0. This region of the input image curve 210 corresponds to the dark object area 340 of the uncompensated or unmodified bitmap 310 shown in FIG. 4 in which every bit in the bitmap is activated. The input image curve 210 is constant at a density of 0.22 from the edge at 0 mm, and past 1 mm as far as the graph extends. Accordingly, the bitmap spots shown in FIG. 4, between bitmap spot 360 at 0.2 mm from the edge to spot 370 at 1.0 mm from the edge all have the same bit count.

The scanned output halftone density curve 220 shown in FIG. 3 illustrates the actual measured white space defect and is generated from an image of a print taken on a flatbed scanner. The scanned output halftone density curve 220 shows the periodicity of the halftone. The periodicity shown in the scanned output halftone densely curve 220 is eliminated by averaging the data over the repeat distance of the halftone, resulting in the smoothed output curve 230 shown in FIG. 3.

The smoothed output curve 230 shown in FIG. 3 shows the magnitude of the white space defect. The magnitude of the white space is a function of distance from the edge of the object. At a distance of 0.2 mm, this curve indicates the output halftone density is 0.13, much lower than the input value of 0.22. Accordingly, the halftone spot 380, 0.2 mm from the edge 340, in the uncompensated or unmodified halftone image 320 shown in FIG. 4 is shrunk from toner starvation. At 1 mm from the edge, the smoothed output curve 230 has returned to its asymptotic value of 0.22. Accordingly, the halftone spot 390, 1 mm from the edge 340, in the uncompensated or unmodified halftone image 320 shown in FIG. 4, is normal sized. The halftone spots between the "shrunken" halftone spot 380 and the normal halftone spot 390 increase in size asymptotically, at the same rate as the smoothed output curve 230.

Figure 5:
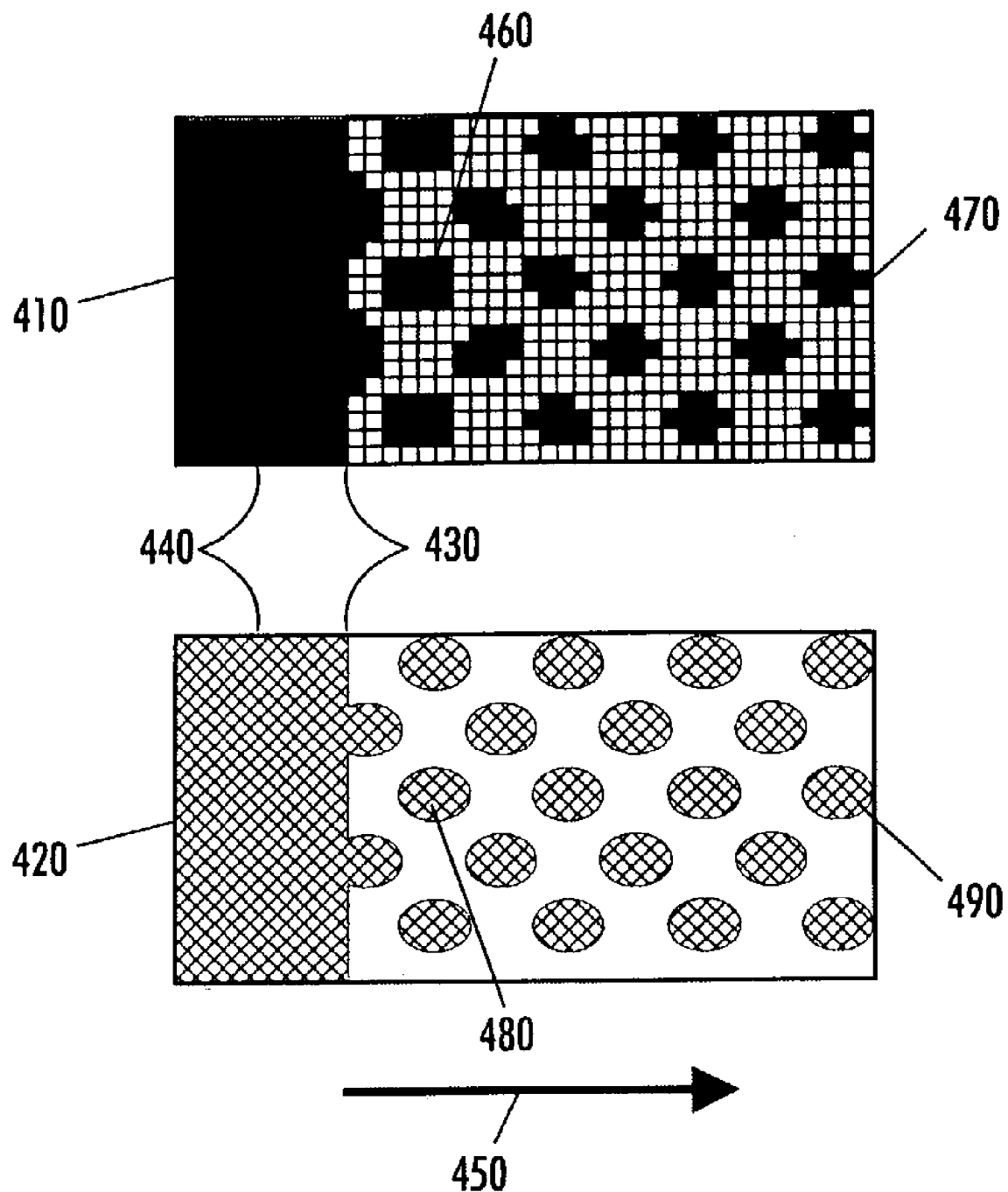
FIG. 5 illustrates a modified bitmap and corresponding halftone image produced from that bitmap having accurate toner density regions in accordance with this invention.

The method used to compensate for white space defect according to this invention is to modify the input image data, whether the input image intensity data or the bitmap generated based on that input image intensity data, to compensate for the resulting white space defect. FIG. 5 is an illustration of the compensated or modified bitmap 410 and the corresponding halftone image 420 produced from that bitmap, both of which have an edge 430 between a dark object 440 on the left of the edge and the halftone spots 460 making up a lighter object 465 on the right. The arrow 450 shown in FIG. 5 indicates the process direction.

The compensated or modified input halftone density curve 240 shown in FIG. 3 indicates the compensation or modification made to either the input image intensity data and/or the resulting bitmap to compensate for the white space defect. In the compensated or modified input halftone density curve 240, the density is increased to 0.31 at 0.2 mm from the edge of compensate for the white space defect. Accordingly, in the compensated or modified bitmap 410, shown in FIG. 5, the compensated or modified bitmap spot 460, located 0.2 mm from the edge 430 has an increased number of bits relative to that shown in FIG. 4.

The magnitude of the compensated or modified input halftone density curve 240 decreases asymptotically from 0.31 at 0.2 mm from the edge to 0.22 at 1 mm from the edge. The number of bits in the bitmap spots also decreases asymptotically from increased number in bitmap spot 460, shown in FIG. 5, located 0.2 mm form the edge 430, to the original bitmap spot size at bitmap spot 470, located 1 mm form the edge 430. When the compensated or modified bitmap 410, shown in FIG. 5 is used in the printing process, the result is a compensated or modified halftone image 420, where the halftone spot 480 located 0.2 mm form the edge 430 is the same size as the halftone spot 490 located 1 mm from the edge 430.

To implement the white space defect compensations systems and methods and to provide a finished output image that accurately reproduces the gray level of the original input image data, the amount of compensation or modification made to the input image intensity data and/or to the resulting bitmap must match the magnitude of the white space defect. The magnitude of the white space defect varies as a function of the relative gray levels of the relatively light object and the relatively dark object and the position and angle of the boundary between the light and dark objects relative to the process direction. The magnitude of the white space defect can also be a function of time, and thus can vary over the life of the printer, or other image forming apparatus, and/or toner supply. As a result, the magnitude of the white space defect should periodically be measured if the white space defect compensation systems and methods according to this invention are to continue to accurately compensate for the white space defect. The magnitude of the white space defect can be measured on a regular schedule or can be measured in response to a request by a user when insufficient or otherwise improper compensation is noticed in a print.

In various exemplary embodiments of the systems and methods according to this invention, the magnitude of the white space defect is measured by printing a calibration pattern onto a substrate, such as paper, with the image forming apparatus, and then scanning the obtained pattern with a scanner. This calibration pattern includes a collection of interfaces between relatively dark objects and relatively light objects that are arranged, in various exemplary embodiments, at different positions and/or angles relative to the process direction and have different relative gray levels. The gray level of the light objects immediately next to the dark objects in the scanned digital image of the print is compared to the reference digital image of the calibration pattern to measure the resulting magnitude of the white space defect. It should be appreciated that the calibration pattern can be automatically printed and/or scanned. Alternatively, the calibration pattern can be manually printed and/or manually scanned.

Figure 6:
FIG. 6 illustrates a first exemplary embodiment of a calibration pattern usable with a scanner to calibrate white space defect modification or compensation parameters according to this invention.
Figure 18:
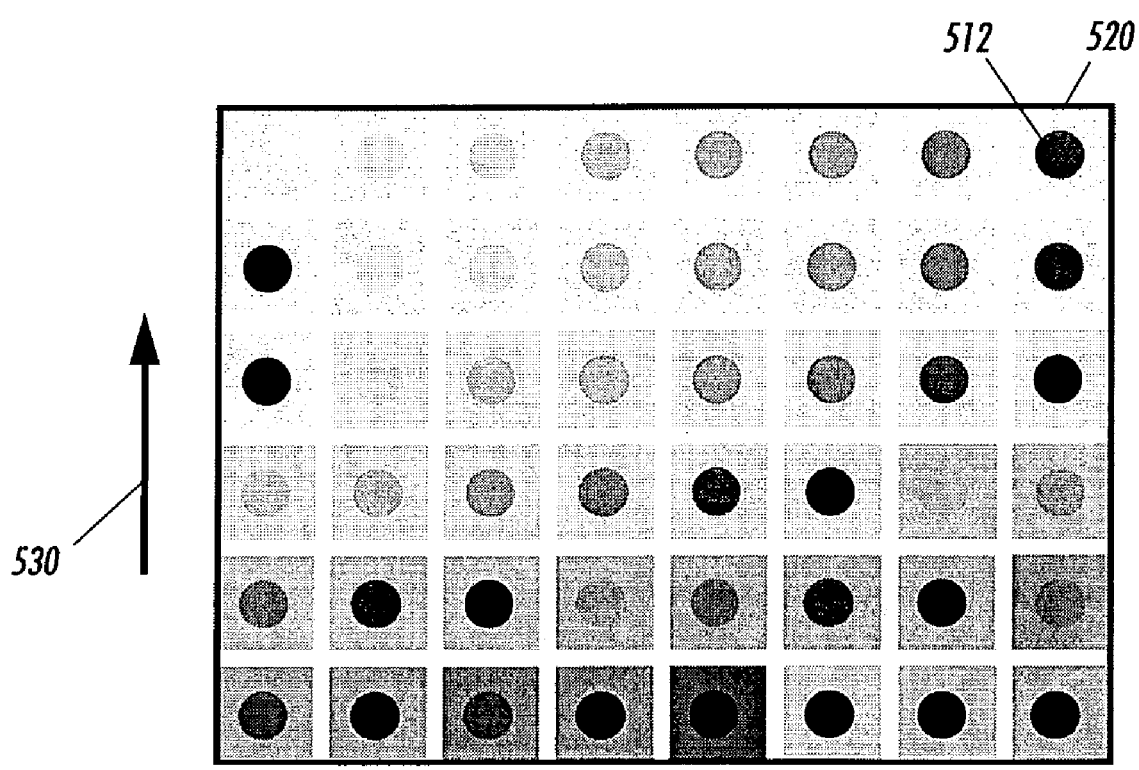
FIG. 18 illustrates a second exemplary embodiment of a calibration pattern usable with a scanner to calibrate white space defect modification or compensation parameters according to this invention.

FIG. 6 shows one exemplary embodiment of a calibration pattern according to this invention that is usable with a scanner to measure the magnitude of the white space defect. The calibration pattern shown in FIG. 6 includes an array of dark rectangles on top of a lighter background. It should be appreciated that, for the exemplary embodiment shown in FIG. 6, each of the rectangles 510 and each of the background squares 520 has a constant toner density. The rectangles 510 are the relatively darker object so that both the lead and the trail edge of the darker rectangle relative to the process direction 530 can be monitored. FIG. 18 shows a second exemplary embodiment of a calibration pattern that uses circles 512 in place of the rectangles 510.

Each of the 70 combinations of dark rectangles 510 and light background squares 520 shown in FIG. 6 has a different set of gray levels or toner densities. In this way, a table of the magnitude of both the lead edge and trail edge white space defect, as a function of an absolute gray level and of the gray level difference, can be generated. In various exemplary embodiments, this table is then fit to parameters contained in a compensation function usable to adjust the input image intensity data and/or the resulting bitmap to compensate for the white space defect. Multilinear interpolation can be used between measured values of the magnitude of the white space to compensate for an arbitrary gray level ratio.

In various exemplary embodiments of the systems and methods according to this invention, an infrared densitometer, such as an enhanced toner area coverage sensor (ETACS), can be used to measure the gray level in the white space region of a calibration pattern. Enhanced toner area coverage sensors are known in the art, and are discussed in U.S. Pat. No. 5,519,497, which is incorporated herein by reference in its entirety.

In various exemplary embodiments, the densitometer is a reflection densitometer and shines a known amount of light onto a developed image on the photoreceptor or printed substrate. The reflection of the specular signal from the photoreceptor is attenuated by the toner, while the diffuse (or scattered) light is increased by presence of toner on the photoreceptor. Both the specular and diffuse light is detected by for example, a photodiode, which generates electrical signals proportional to the amount of received light. Both the specular and diffuse light is a monotonic function of the developed mass. With suitable calibration, the mass or density that was actually developed can be inferred from the optical signal.

In various exemplary embodiments, the densitometer or enhanced toner area coverage sensor typically measures the reflectance of a beam with a diameter of about 2 mm to about 4 mm. The 2 mm to 4 mm beam size is selected to reduce the halftone noise over many beam averages on the halftone cells. The resolution of an enhanced toner area coverage sensor is dependant on beam size. To be useful in measuring the white space regions, a resolution of much less that 1 mm is desirable.

Figure 7:
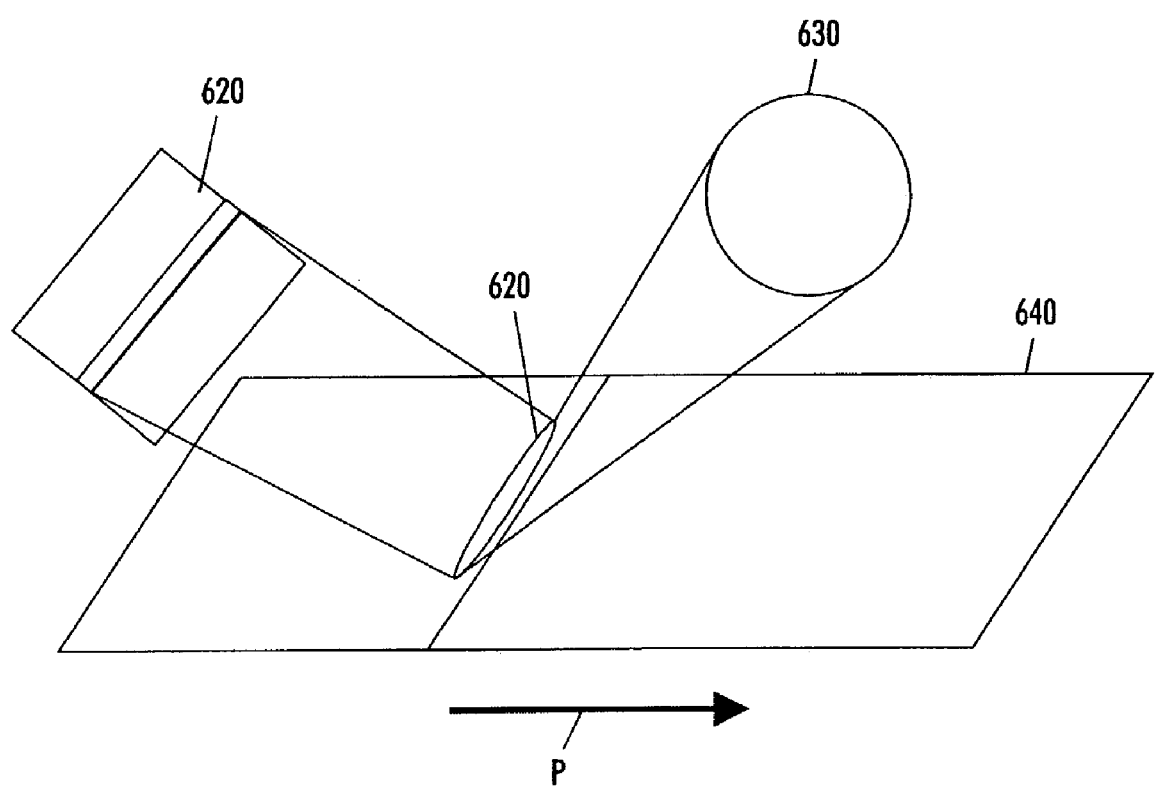
FIG. 7 illustrates one exemplary embodiment of a modified toner area coverage sensor usable to calibrate white space defect modification or compensation parameters according to this invention.

FIG. 7 illustrates a second exemplary embodiment of the systems and methods for measuring the magnitude of the white space defect according to this invention that uses a modified enhanced toner area coverage sensor. In the exemplary embodiment shown in FIG. 7, the beam generated by an enhanced toner area coverage sensor emitter 610 is reshaped into an ellipse 620. The short dimension of the ellipse is much less than 1 mm and is used to provide greater resolution perpendicular to the edge between dark objects and light objects in the calibration pattern. The equivalent area 630 of the beam is equal to the typical 2 mm to 4 mm beam to maintain low halftone noise levels.

Figure 8:
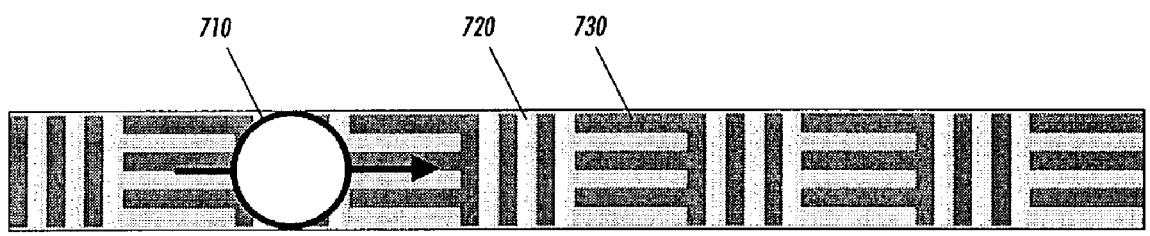
FIG. 8 illustrates one exemplary embodiment of a calibration pattern usable with one of several existing toner area coverage sensors to calibrate white space defect modification or compensation parameters according to this invention.

FIG. 8 illustrates a calibration pattern usable in a third exemplary embodiment of the systems and methods for measuring the magnitude of the white space defect according to this invention. FIG. 8 shows a typical unmodified enhanced toner area coverage sensor and a calibration pattern. As shown in FIG. 8, a typical round 3 mm beam 810 is used with a calibration pattern alternating between two or more structured image portions 720 and 730. The image portions 720 and 730 are designed so that input bitmaps of each image portions 720 and 730 have, on average, the same number of bits turned on. The image portions 720 and 730 are also designed to have a different number of edges of a specific angle relative to the process direction.

The structured image portion 720 shown in FIG. 8 has edges perpendicular to the process direction, and, as a result, a white space defect occurs. The structured image portion 730 shown in FIG. 8 has edges parallel to the process direction and, as a result, little or no white space defect occurs. If white space occurs, as shown in the structured image portion 720, the enhanced toner area coverage sensor beam will measure a lighter average density than the structured image portion 730, where white space does not occur.

Figure 9:
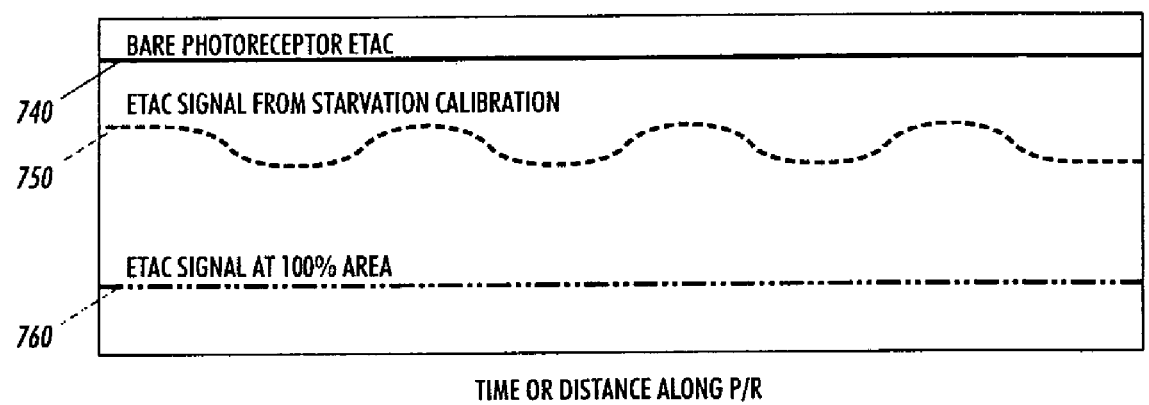
FIG. 9 is a graph illustrating the output of the one of several existing toner area coverage sensors when used with the calibration pattern shown in FIG. 8.

FIG. 9 is a graph illustrating the output of the unmodified enhanced toner area coverage sensor used with the calibration pattern shown in FIG. 8. The top curve 740 is the enhanced toner area coverage sensor signal from a base photoreceptor indicating 0% toner density. The bottom curve 760 is the enhanced toner area coverage sensor signal indicating 100% toner density. The middle curve 930 is the enhanced toner area coverage sensor signal from the calibration pattern. The signal output from the middle curve 750 varies from structured image portion to structured image portion due to the white space in the structured image portion 720.

By generating additional calibration patterns, such as the one shown in FIG. 8, with different spacing between the edges, the white space as a function of distance from the edge can be determined. This difference in signal output from each of these patterns is then mapped to the compensation function used to generate the compensated image intensity data and/or the compensated bitmap.

One exemplary embodiment of a method to determine the bitmap modification for each pixel is to examine a neighborhood of the pixel large enough to detect any edges between dark and light objects that can cause a white space defect at that pixel. Examining large clusters of data in this way is an inefficient use of resources, as each pixel being examined requires a minimum of 20-30 scanlines of pixels to be compared to the current pixel and possibly to each other. The bandwidth required to perform the comparison on this large a set of pixels is difficult to meet in a real time process.

A second exemplary embodiment of a method to determine the bitmap modification for each pixel uses an approximation that only requires two scan lines of data be examined at a time. This method uses the current scan line and a one scan line historical state which approximates the effect on a scan line that is many scanlines away of a falling edge from a dark object to a light object. It should be appreciated that, in the following description, in various exemplary embodiments, the image intensity value for a pixel ranges from 0, representing the lowest image intensity value, to 255, representing the highest image intensity value.

The white space defect can occur at the leading edge, a trailing edge, or at both edges in a printed image. When a defect occurs at the trailing edge only, the image is processed from the leading edge of the image to the trailing edge of the image. When a defect occurs at the leading edge only, the image is first send to a buffer. The image is then processed from the trailing edge of the image to the leading edge of the image. When a defect occurs at both the leading edge and the trailing edge, the image data is compensated using a two step process. First, the trailing edge is compensated by processing the image from the leading edge to the trailing edge. The compensated image data is saved in a buffer. Then, the buffered image is processed from the trailing edge to the leading edge to compensate for the leading edge white space defects. The twice-compensated image data is buffered and printed.

Eq. (1) is an exemplary equation usable to determine the compensated or modified image intensity value $I_c$ for a given pixel. That is, the modified or compensated image intensity value $I_c$ is:

$$I_c = I_p - M_p \text{ for } 0 < I_p - M_p < I_m, \quad (1)$$
$$= 0 \quad \text{ for } I_p - M_p < 0$$
$$= I_m \quad \text{ for } I_m < I_p - M_p$$

where:

$I_p$ is an input intensity value for the current pixel p of the current scan line;

$M_p$ is a modification value; and $I_m$ is a maximum image intensity value;

Eq. (2) is an exemplary equation usable to determine the modification $M_p$ required for a given pixel. That is, the modification $M_p$ is:

$$M_p = \alpha C_p*(H_p - I_p) + 0.5, \quad (2)$$

where:

$\alpha$ is a calibration factor for a magnitude of the starvation object;

$C_p$ is a modification factor based on an image magnitude of the current pixel p;

$H_p$ is a historical state value for the current pixel p; and $I_p$ is the image value for the current pixel p in the input image.

Eq. (3) is an exemplary equation defining the modification factor $C_p$ for the current pixel based on the image value $I_p$ of the current pixel. That is, $C_p$ is:

$$C_p = 1 - 4[(I_p/I_m) - 0.5]^2, \quad (3)$$

where $I_m$ is the maximum image intensity value of the input image data. For example, for 8-bit image data, the maximum image intensity value $I_m$ is 255.

Figure 10:
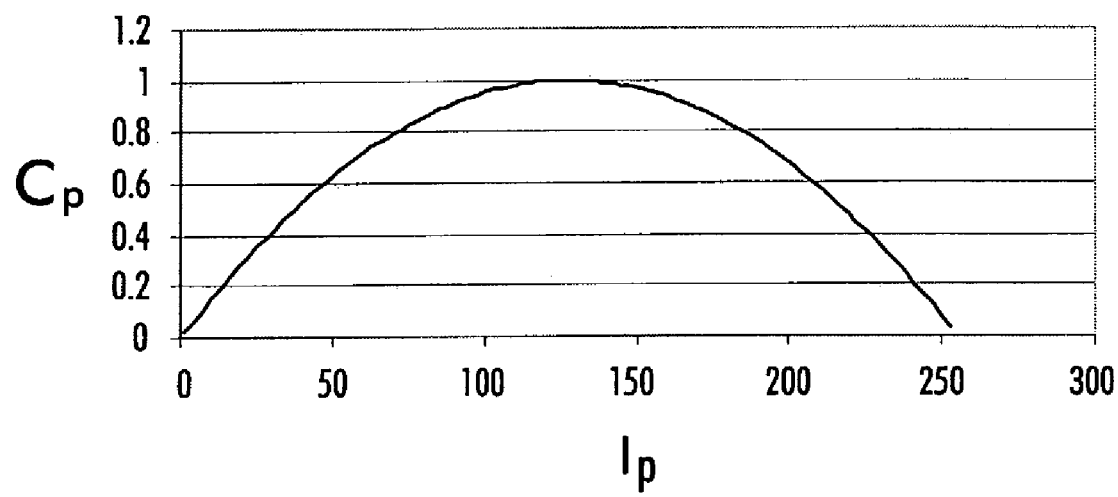
FIG. 10 is a graph illustrating the contribution made to the output of a specific pixel in a modified image based on the input value of that specific pixel.

FIG. 10 is a graph showing one exemplary embodiment of the relationship between the modification factor $C_p$ and the image intensity value $I_p$ for the current pixel p. As shown in FIG. 10, this relationship is a downward pointing parabola having a maximum value of approximately 1 at the midrange image intensity values of 127 and 128 (for 8-bit image values) and decreasing to 0 at image intensity values of 1 and 255 (for 8-bit image values).

Eq. (4) is one exemplary equation defining the historical state value $H_j$ for the next scanline j relative to the current pixel p. That is, the historical state value $H_j$ is:

$$H = (\beta * H_p + I_p)/(1+\beta) + 0.5 \quad (4)$$

where:

$\beta$ is a calibration factor for the white space defect;

$H_p$ the historical state for the pixel p for the current scan line; and $I_p$ is the image intensity value of the current pixel p.

Figure 11:
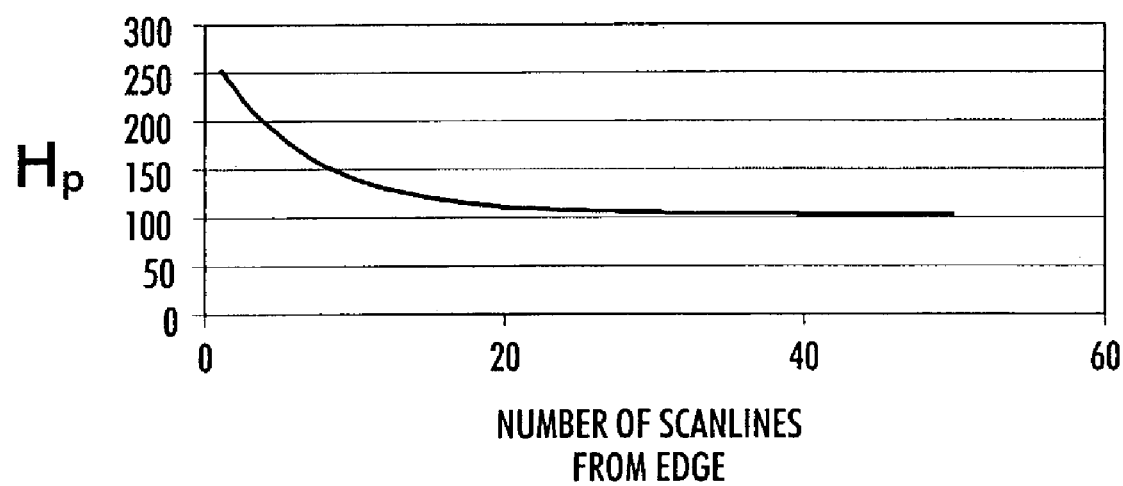
FIG. 11 is a graph illustrating the magnitude of the historical state of a pixel based on its distance, in scan lines, from an input edge having an image intensity change of 255 to 100.

FIG. 11 is a graph showing one exemplary embodiment of the relationship of the historical state value $H_p$ as a function of number of scanlines from an edge, where the image value was 255 to the left of the edge and 100 to the right of the edge.

Figure 12:
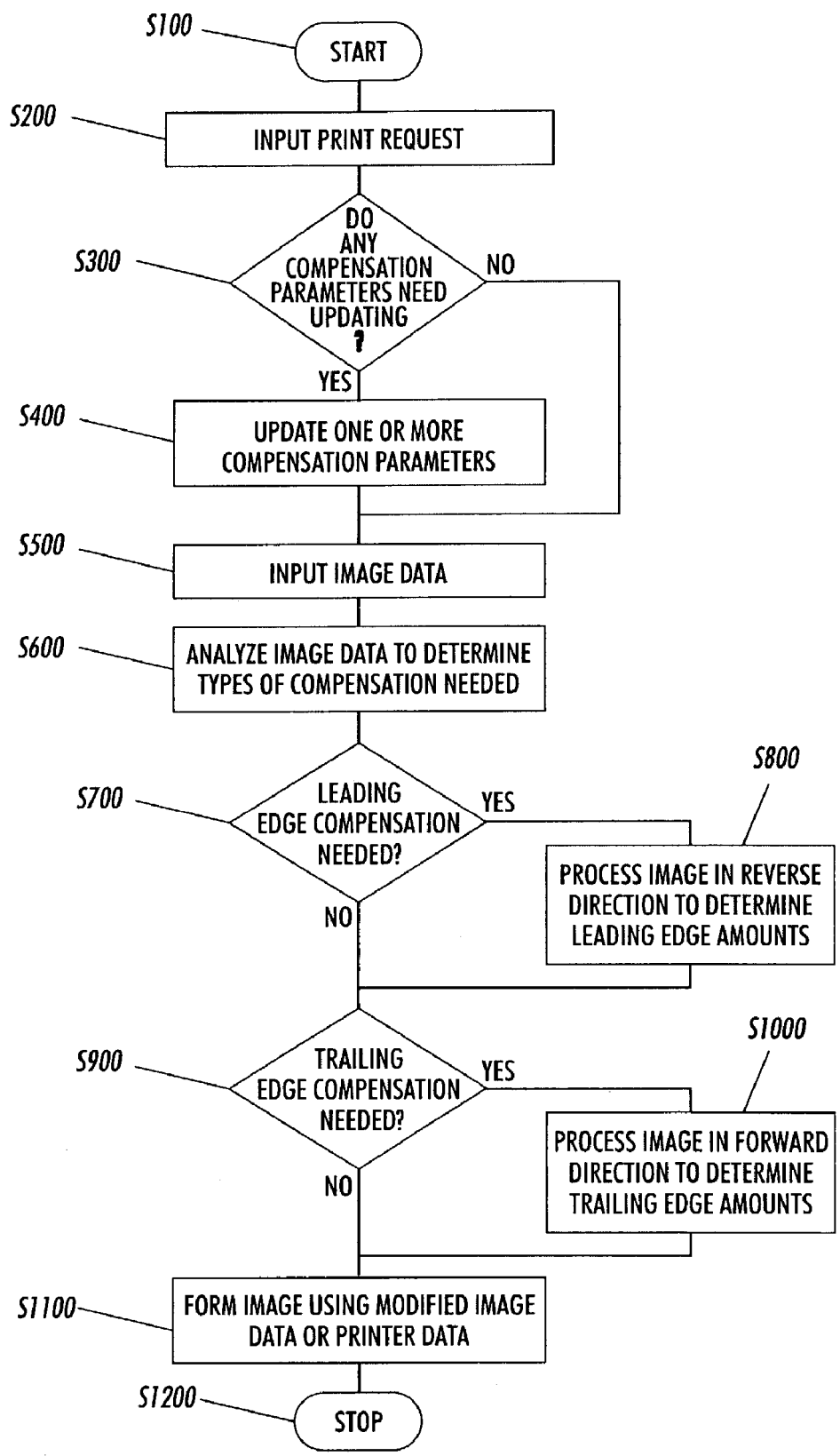
FIG. 12 is a flowchart outlining one exemplary embodiment of a method for compensating for white space defects.

FIG. 12 is a flowchart outlining one exemplary embodiment of a method for compensating for white space print defects. As shown in FIG. 12, operation of the method begins in step S100, and continues to step S200, where a request for outputting a hard copy of an image on an image output terminal that experiences the white space defect is received. Then, in step S300, a determination is made whether one or more compensation parameters need to be updated. If any compensation parameters need to be updated, operation continues to step S400. Otherwise, operation jumps directly to step S500.

In step S400, the one or more magnitudes of the white space defect are measured and the compensation parameters are updated. Then, in step S500, the image data to be printed is input. Next, in step S600, the image data is analyzed to determine which kind, trailing edge, leading edge, or both, of white space defect compensation is desired or needed. Operation then continues to step S700.

In step S700, a determination is made whether trailing edge compensation is desired. If trailing edge compensation is desired, operation continues to step S800. Otherwise, operation jumps directly to step S900. In step S800, the image data is processed in a forward direction to determine the trailing edge compensation amounts that each pixel needs to be modified by, and to modify each pixel by the determined trailing edge compensation amount. Operation then continues to step S900, where a determination is made whether leading edge compensation is desired. If leading edge compensation is desired, operation continues to step S1000. Otherwise, operation jumps directly to step S1100. In step S1000, the image data is processed in a reverse direction to determine the leading edge compensation amounts that each pixel needs to be modified by, and to modify each pixel by the determined leading edge compensation amount. Operation then continues to step S1100, where the compensated bitmap data is used to generate the requested hard copy output. Then, in step S1200, operation of the method ends.

Figure 13:
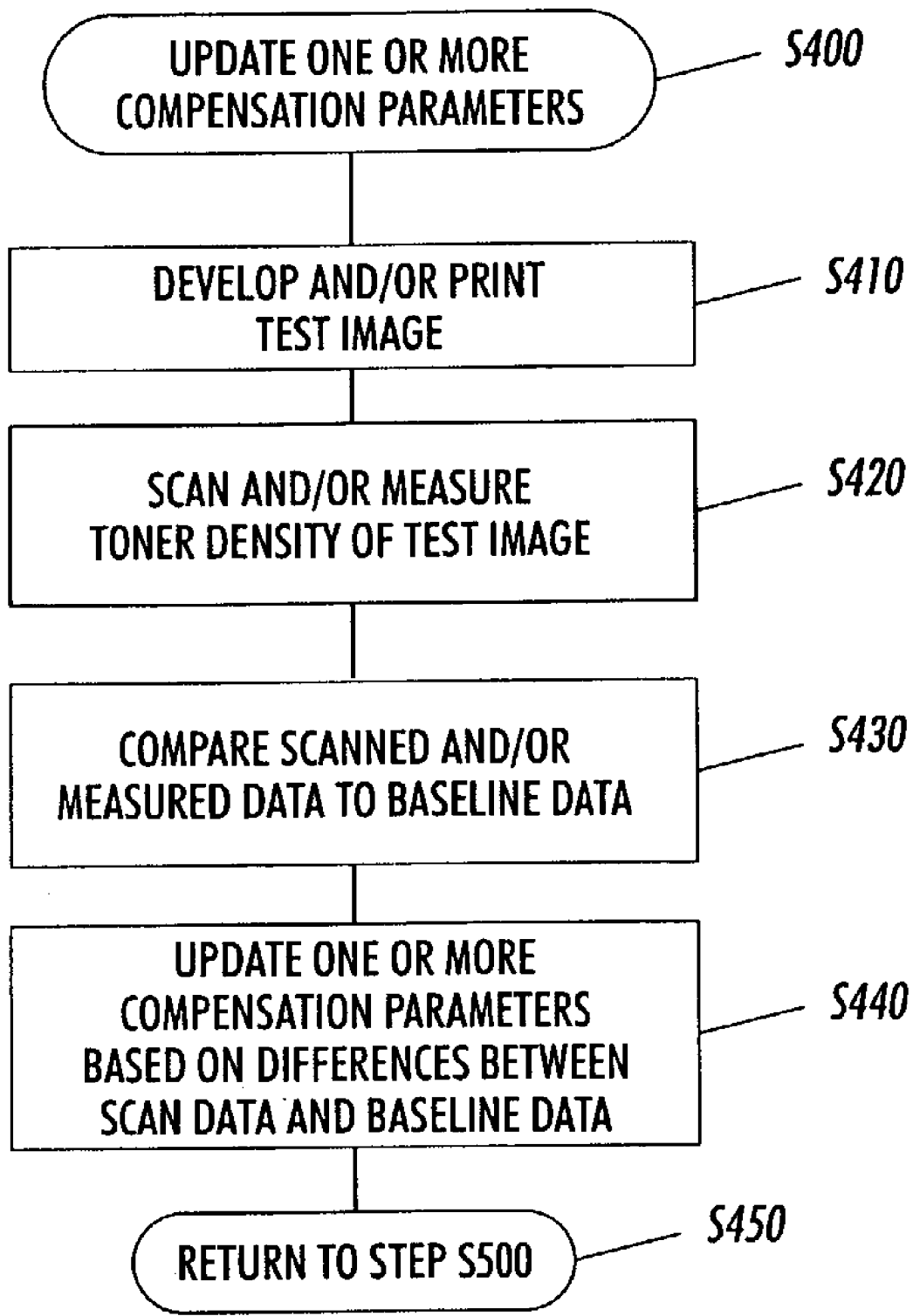
FIG. 13 is a flowchart outlining in greater detail one exemplary embodiment of a method for updating the modification or compensation parameters used to compensate for white space defects.

FIG. 13 is a flowchart outlining in greater detail one exemplary embodiment of a method for updating one or more of the compensation parameters. As shown in FIG. 13, operation of the method begins in step S400, and continues to step S410, where a test image or calibration pattern is developed on the photoconductive surface and/or one or both of the calibration patterns shown in FIG. 6 or 8, or any other pattern which has dark to light object edges, can be used as the calibration pattern in step S910. Next, in step S420, the test image on the photoconductive surface and/or on the printed substrate is scanned and/or its toner density is measured. Then, in step S430, the scanned image and/or the measured toner density is compared to a baseline image and/or to set of toner densities, respectively, to detect differences caused by the white space defect. Operation then continues to step S440.

In step S440, the differences detected in step S430 are used to determine one or more updated values for one or more of the compensation parameters. Operation then continues to step S450, where operation returns to step S500.

Figure 14:
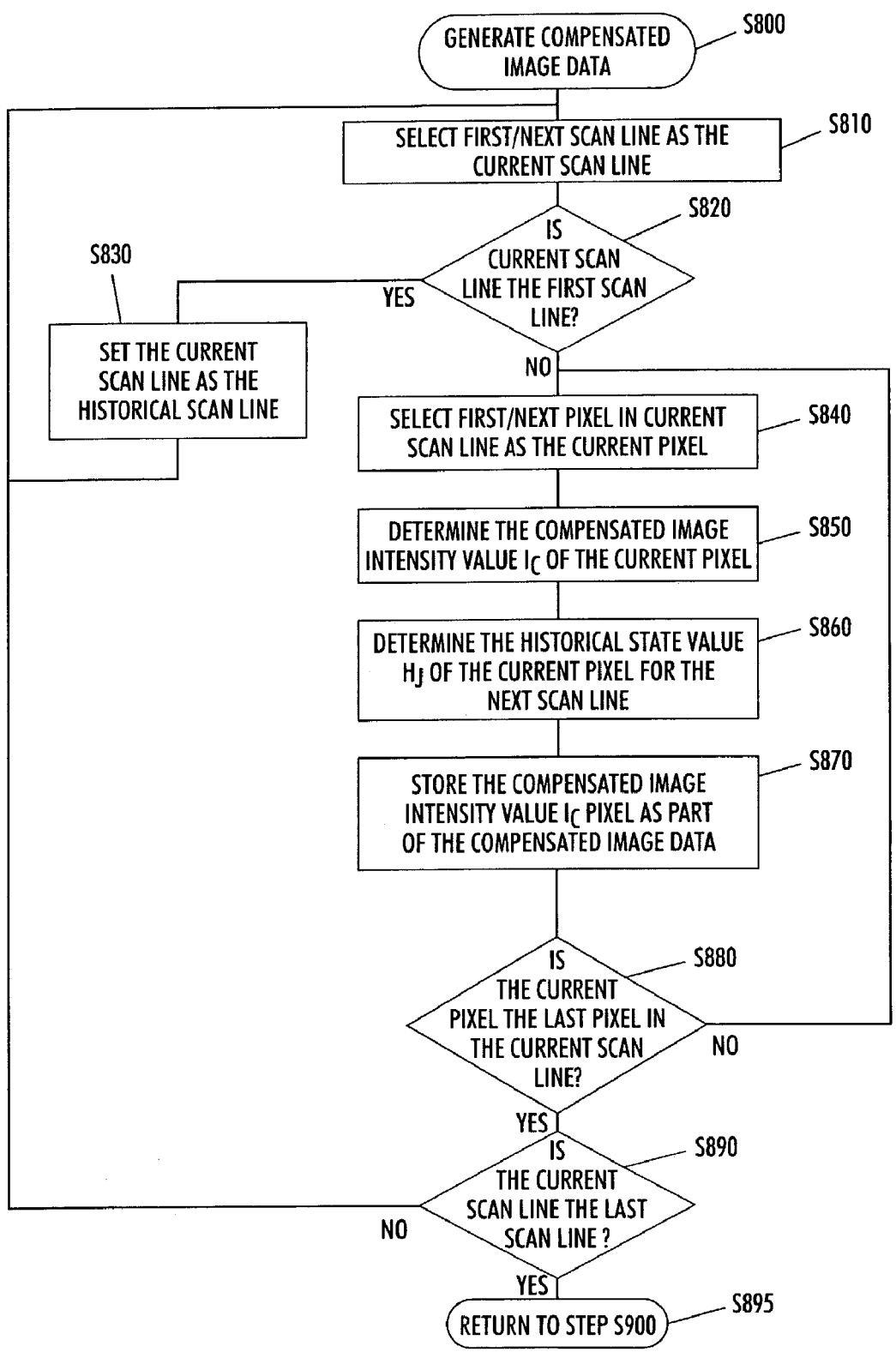
FIG. 14 is a flowchart outlining in greater detail one exemplary embodiment of a method for applying the modification or compensation values to a digital image.

FIG. 14 is a flowchart outlining in greater detail one exemplary embodiment of a method for processing the image data in the forward direction to generate the leading edge compensated image data of step S800. As shown in FIG. 14, operation of the method begins in step S800, and continues to step S810, where the first or next scan line of the digital image to be printed is input as the current scan line. Then, in step S820, a determination is made whether the current scan line is the first scan line. If the current scan line is the first scan line, operation continues to step S830. Otherwise, operation jumps to step S840.

In step S830, the current scan line is identified as the historical scan line. Operation then returns to step S810. In contrast, in step S840, the first or next pixel in the current scan line is selected as the current pixel. Then, in step S850, the compensated input image intensity value for the current pixel is determined. Next, in step S860, the historical state value $H_j$ of the current pixel for the next scan line is determined. In various exemplary embodiments, the historical state value $H_j$ is determined by first averaging the compensated image intensity value of the current pixel with the input image intensity values of pixels in the neighborhood of the current pixel that are in the current scan line. It should be appreciated that a more complex one-dimensional filter can be used to adjust the input image intensity value. In various other exemplary embodiments, Eq. (4) is then used to finally determine the historical state value $H_j$. Operation then continues to step S870.

In step S870, the compensated image intensity value for the current pixel is stored as part of the trailing edge compensated image data. Next, in step S880, a determination is made whether the current pixel is the last pixel in the current scan line. If the current pixel is the last pixel in the current scan line, operation continues to step S890. Otherwise, operation returns to step S840. In step S890, a determination is made whether the current scan line is the last scan line. If the current scan line is the last scan line, operation continues to step S895. Otherwise, operation returns to step S610. In step S895, operation returns to step S900.

Figure 15:
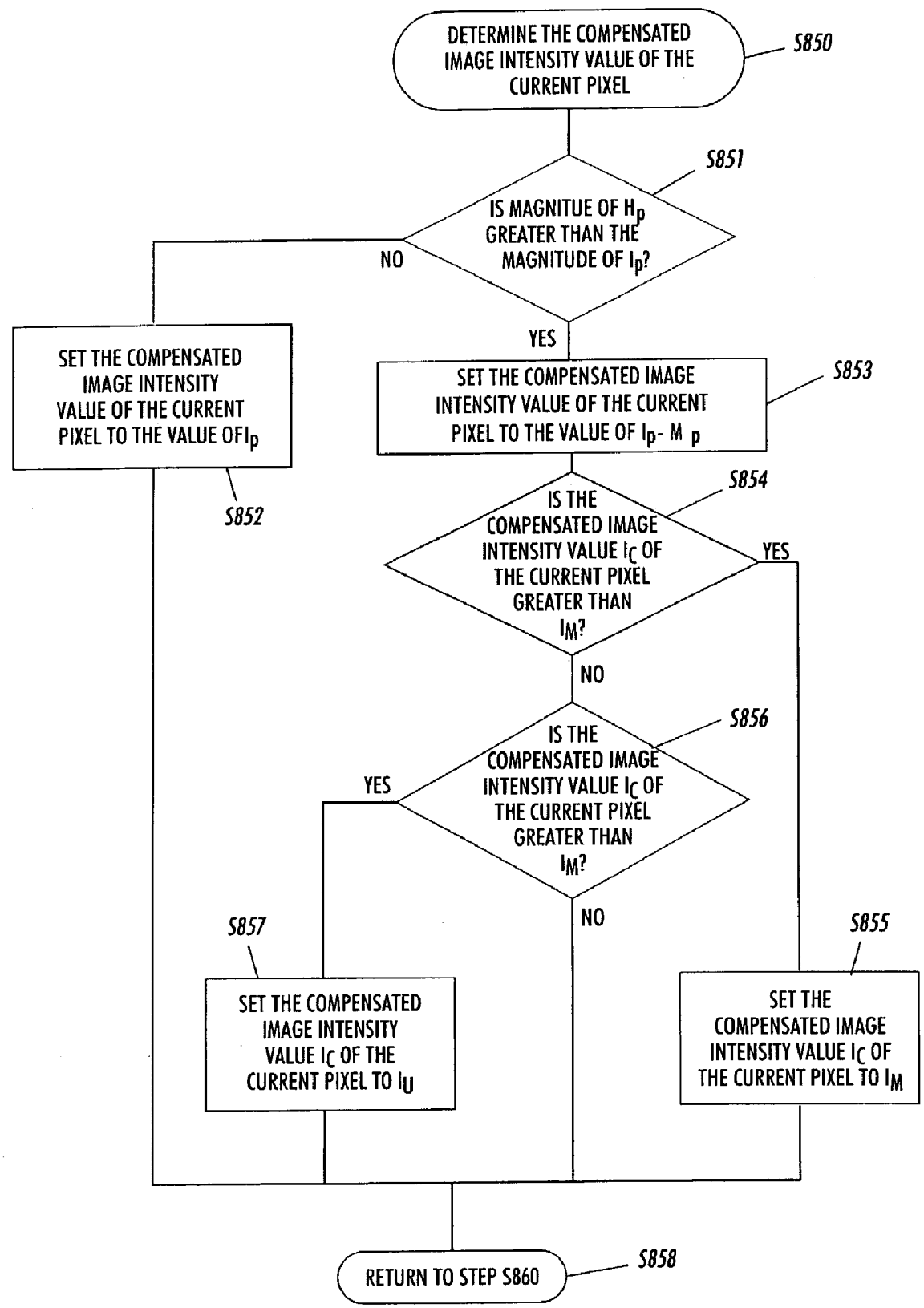
FIG. 15 is a flowchart outlining in greater detail one exemplary embodiment of a method for determining the magnitude of the output scan line at a pixel.

FIG. 15 is a flowchart outlining in greater detail one exemplary embodiment of a method for determining the trailing edge compensated image intensity value at the current pixel of step S850. As shown in FIG. 15, operation of the method begins in step S850, and continues to step S851, where a determination is made whether the historical state value $H_p$ for the current pixel of the current scan line is greater than the input image intensity value $I_p$ of the current pixel. If the historical state value $H_p$ for the current pixel is greater than the input image intensity value $I_p$ of the current pixel, operation jumps to step S853. Otherwise, operation continues to step S852.

In step S852, the trailing edge compensated image intensity value $I_c$ at the current pixel is set to the input image intensity value $I_p$ of the current pixel. Operation then jumps to step S858. In contrast, in step S853, the trailing edge compensated image intensity value $I_c$ for the current pixel is set to the input image intensity value $I_p$ of the current pixel minus the trailing edge image intensity value modification $M_p$ required for the current pixel. In various exemplary embodiments, the trailing edge image intensity value modification $M_p$ required for the current pixel is determined using Eq. (2). Then, in step S854, a determination is made whether the trailing edge compensated image intensity value $I_c$ for the current pixel is greater than a maximum image intensity value $I_m$. If the trailing edge compensated image intensity value $I_c$ for the current pixel is not greater than the maximum image intensity value $I_m$, operation jumps to step S856. Otherwise, operation continues to step S855.

In step S855, the trailing edge compensated image intensity value $I_c$ for the current pixel is set to the maximum image intensity value $I_m$. Operation then jumps to step S858. In contrast, in step S856, a determination is made whether the trailing edge compensated image intensity value $I_c$ for the current pixel is less than a minimum image intensity value $I_m$. If the trailing edge compensated image intensity value $I_m$ for the current pixel is not less than $I_m'$, operation jumps to step S858. Otherwise, operation continues to step S857. In step S857, the tailing edge compensated image intensity value $I_m$ for the current pixel is set to $I_m'$. Operation then continues to step S858, where operation of the method returns to step S860.

It should be appreciated that step S1000 operates substantially identically to steps S800-S895 outlined above with respect to FIGS. 14 and 15, except that the pixels of the trailing edge compensated image date are analyzed from the last line towards the first line. Similarly, rather than determining trailing edge compensated image data, compensated image intensity values $I_c$ or $I_m$ or trailing edge image intensity value modification $M_p$ values, leading edge compensated image data, compensated image intensity values $I_c$ or $I_m$ and leading edge image intensity value modification $M_p$ values are determined in step S1000.

Figure 16:
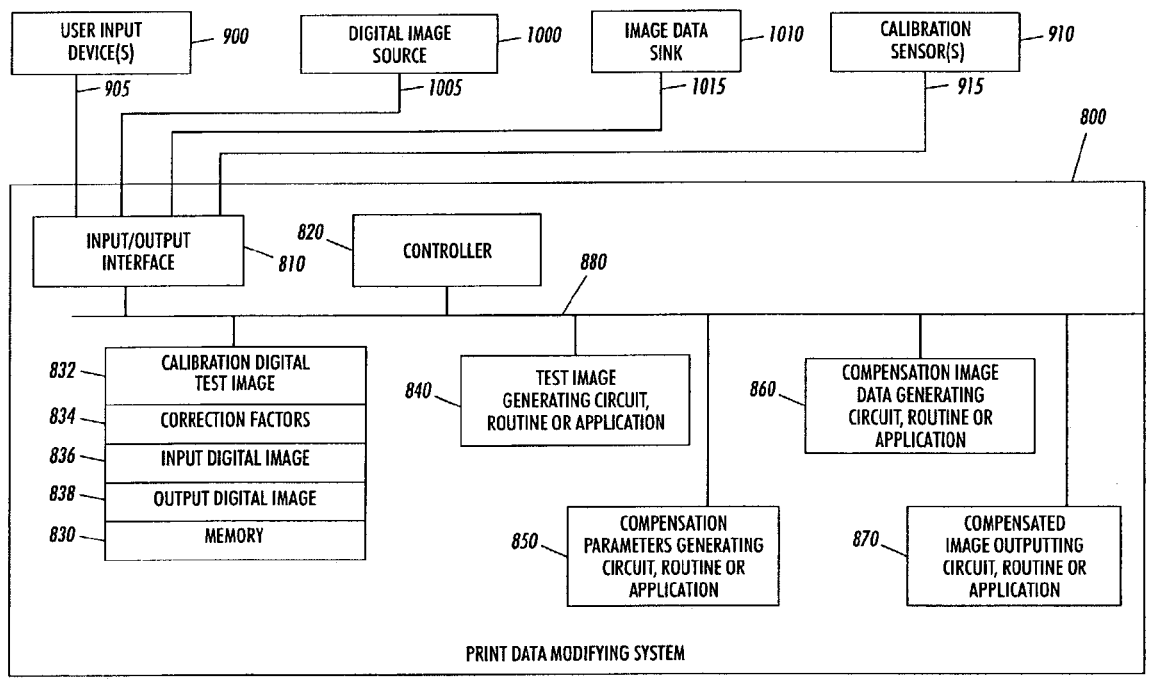
FIG. 16 is a block diagram of one exemplary embodiment of a print data modifying system according to this invention.

FIG. 16 shows one exemplary embodiment of a print data modifying system 800 usable to generate compensated image intensity data that reduces the white space defect according to this invention. As shown in FIG. 16, the print data modifying system 800 includes an input/output interface 810, a controller 820, a memory 830, a test image generating circuit, routine or application 840, a compensation parameters generating circuit, routine or application 850, a compensated image data generating circuit, routine or application 860, and a compensated image outputting circuit, routine or application 870, each interconnected by one or more control and/or data busses and/or application programming interfaces 880.

As shown in FIG. 16, one or more user input devices 900, one or more calibration sensors 910, an image data source 1000, and an image data sink 1010 are connected to the print data modifying system 800 by links 905, 915, 1005 and 1015, respectively.

In general, the image data source 1000 can be any known or later-developed device that is capable of providing image data to the print data modifying system 800. In general, the image data sink 1010 can be any known or later-developed device that is capable of electrophotographically printing the confirmation sheet generated by the print data modifying system 800 and that experiences the white space defect, or a storage device or communication network that can store or transmit the data for later and/or remote printing of the data on such a printer.

The image data source 1000 and/or the image data sink 1010 can be integrated with the print data modifying system 800, such as in a digital copier. In addition, the print data modifying system 800 may be integrated with devices providing additional functions in addition to the image data source 1000 and/or the image data sink 1010, in a larger system that performs all functions, such as a multi-function printer/scanner/copier.

The one or more user input devices 900 may be any combination of one or more input devices, such as a keyboard, a mouse, a joy stick, a trackball, a touch pad, a touch screen, a pen-based system, a microphone and associated voice recognition software, or any other known or later-developed device usable to input user commands to the print data modifying system 800. It should be understood that the one or more user input devices 900, of FIG. 16 do not need to be the same type of device.

Each of the links 905, 915, 1005 and 1015 connecting the input device(s) 900, the calibration sensor(s) 910, the image data source 1000 and the image data sink 1010, to the print data modifying system 800 can be a connection device, such as a direct cable connection, a modem, a local area network, a wide area network, a storage area network an intranet, the Internet, any other distributed processing network, or any other known or later-developed connection device. It should be appreciated that any of these connections may include both wired and wireless portions. In general, each of the links 905, 915, 1005 and 1015 can be of any known or later-developed connection system or structure usable to connect the respective devices to the print data modifying system 800. It should be understood that the links 905, 915, 1005 and 1015 do not need to be of the same type.

The memory 830 can be implemented using any appropriate combination of alterable, volatile, or non-volatile memory or non-alterable, or fixed memory. The alterable memory, whether volatile or non-volatile can be implemented using any one or more of static or dynamic RAM, a floppy disk and disk drive, a writable or rewritable optical disk and disk drive, a hard drive, flash memory or the like. Similarly, the non-alterable or fixed memory can be implemented using any one or more of ROM, PROM, EPROM, EEPROM, and gaps an optical ROM disk, such as a CD-ROM or DVD-ROM disk and disk drive or the like.

When operating the print data modifying system 800, the print request is input from one of the user input devices 900 over the link 905. The input/output interface 810 inputs the print request, and, under the control of the controller 820, forwards it to the test image generating circuit, routine or application 840.

The test image generating circuit, routine or application 840 then determines if one or more of the one or more compensation parameters need to be updated, either based on an update schedule stored in the memory 830 and/or as an operator selected option submitted as part of the request. If one or more compensation parameters need to be updated, the test image generating circuit, routine or application 840 retrieves, under the control of the controller 820, the calibration test image data from a calibration test image portion 832 of the memory 830. The test image generating circuit, routine or application 840 then outputs, under the control of the controller 820, the test image to the image data sink 1010 over the link 1015 for printing by the image data sink 1010 or a printer connected to the image data sink 1010.

The compensation factor generating circuit, routine or application 850, then retrieves, under control of the controller 820, white space defect magnitude measurements over the link 915, obtained from the printed test image by the one or more calibration sensors 910. The compensation parameters generating circuit, routine or application 850 then determines the one or more compensation parameters to be used in the bitmap compensation process based on the current white space defect magnitude measurements. Under control of the controller 820, the compensation parameters generating circuit, routine or application 850 either stores the compensation parameters in the compensation parameters portion 834 of the memory 830, or output the compensation factors directly to the compensated image data generating circuit, routine or application 860. It should be appreciated that the white space defect magnitude measurements can also be made with a flatbed scanner. In this case, the scanner information would be received over a link from the flatbed scanner by the input/output interface. Under control of the controller 820, the scanner information is stored in the compensation parameters portion 834 or provided directly to the compensation parameters generating circuit, routine or application 850.

The compensated image data generating circuit, routine or application 860, under control of the controller 820, then retrieves the compensation parameters from the compensation parameters portion 834 or receives the compensation parameters directly from the compensation parameters generating circuit, routine or application 850. The compensated image data generating circuit, routine or application 860, under control of the controller 820, then retrieves the input image data from the input image data portion 836 or receives the image data directly from the image data source 1000 over the link 1005 and through the input/output interface 810.

In various exemplary embodiments, if there are any trailing edge white space defects, the compensated image data generating circuit, routine or application 860, under control of the controller 820, first modifies the input image data to generate trailing edge compensated input image data that compensates for the trailing edge white space defects. Next, if there are any leading edge white space defects, the compensated image data generating circuit, routine or application 860, under control of the controller 820, modifies the trailing edge compensated image data to generate leading and trailing edge compensated input image data that compensates for the leading and trailing edge white space defects. The leading and trailing edge compensated image data is then stored in an output image data portion 838 of the memory 830 or is output directly by the compensated image data generating circuit, routine or application 860, under control of the controller 820, to the output image generating circuit, routine or application 870.

Of course, if there are no leading edge white space defects, the trailing edge compensated image data is stored in the output image data portion 838 of the memory 830 or is output directly by the compensated image data generating circuit, routine or application 860, under control of the controller 820, to the output image generating circuit, routine or application 870. Similarly, if there are no trailing edge white space defects, the compensated image data generating circuit, routine or application 860, under control of the controller 820, modifies the input image data to generate leading edge compensated input image data that compensates for the leading edge white space defect. The leading edge compensated image data is then stored in the output image data portion 838 of the memory 830 or is output directly by the compensated image data generating circuit, routine or application 860, under control of the controller 820, to the output image generating circuit, routine or application 870.

In such exemplary embodiments, the output image generating circuit, routine or application 870 then, under control of the controller 820, either retrieves the compensated image data from the compensated image data generating circuit, routine or application 860. The output image generating circuit, routine or application 870, under control of the controller 820, inputs the compensated image data and outputs, under control of the controller 820, a bitmap image usable to drive a printer to form the desired image, where the image data of the bitmap has been compensated in view of the white space defect, to the image data sink 1010 over the link 1015.

It should be appreciated that, if the image data sink 1010 is a printer, that printer can print an image using the bitmap image data generated from the compensated image data. It should further be appreciated that, if the image data sink is a storage device, the bitmap image data can be stored for later printing by a printer. Alternatively, if the image data sink is a transmission structure, such as the Internet, the bitmap image data can be transmitted to a remote printer or storage device.

It should also be appreciated that in various exemplary embodiments, the compensated image outputting circuit routine or application can be omitted. In this case, the compensated image data itself is output to the image data sink 1010. This is useful when the image data sink is a printer, or conveys the compensated image data to a printer, that itself converts the compensated image data into a bitmap or other raster form suitable for printing.

Each of the various embodiments of the print data modifying system 800 can be implemented as software executing on a programmed general purpose computer, a special purpose computer, a microprocessor or the like. Alternatively, each of the various embodiments of the print data modifying system 800 can be implemented as a routine embedded in a library, or a resource residing on a server, or the like. Each of the various embodiments of the various embodiments of the print data modifying system 800 can be also be implemented by physically incorporating that device into a software and/or hardware system, such as a speech recognition system or language translation system of a computer or communication device. It should be understood that each of the various embodiments of the print data modifying system 800 do not need to be implemented the same way.

It should also be understood that each of the circuits, routines, applications or managers shown in FIG. 16 can be implemented as portions of a suitably programmed general-purpose computer. Alternatively, each of the circuits, routines or applications shown in FIG. 16 can be implemented as physically distinct hardware circuits within an ASIC, using a digital signal processor (DSP), using a FPGA, a PDL, a PLA and/or a PAL, or using discrete logic elements or discrete circuit elements. The particular for of the circuits, routines or applications shown in FIG. 16 will take is a design choice and will be obvious and predictable to those skilled in the art. It should be appreciated that the circuits, routines or applications shown in FIG. 16 do not need to be of the same design.

While particular exemplary embodiments have been described above, alternatives, modifications, variations, improvements, and substantial equivalents that are or may be presently unforeseen may arise to applicants or others skilled in the are. Accordingly, the appended claims as filed and as they may be amended are intended to embrace all such alternatives, modifications variations, improvements, and substantial equivalents.

What is claimed is:

1. A method for compensating for white space defects in a printed image, comprising:

inputting image data usable to form the printed image;

modifying the image data of at least one relatively lighter density region in the input image data to form modified image data, the modified image data compensated for a white space defect that would occur in that at least one region without compensation, the white space defect representing a diminished toner density region wherein modifying the input image data of at least one relatively lighter density region in the input image data comprises:

(a) selecting a first scan line of the input image data as the current scan line;

(b) identifying the current scan line as an historical scan line, the image value of each pixel of the current scan line defining an historical state value for that pixel, and storing the current scan line as a portion of the modified image data;

(c) selecting a next scan line of the input image data as the current scan line;

(d) selecting a first pixel in the current scan line as a current pixel;

(e) determining a compensated image value for the current pixel based on an historical state value for that pixel and a current image value of that pixel;

(f) determining an updated historical state value of the current pixel, the updated historical state value to be used as the historical state value for a corresponding pixel of a subsequent scan line;

(g) storing the compensated input image value for the current pixel into the modified image data;

(h) repeating steps (d)-(g) for each other pixel, in turn, of the current scan line until steps (d)-(g) have been repeated for a last pixel of the current scan line; and (i) repeating steps (c)-(h) for each subsequent scan line, in turn, of the input image data until steps (c)-(h) have been repeated for a last scan line of the input image data.

2. The method of claim 1, wherein determining the updated historical state value comprises averaging the compensated image value of the current pixel with image values of a plurality of pixels in the current scan line in a neighborhood around the current pixel.

3. The method of claim 1, wherein determining the updated historical state value comprises determining the updated historical state value H as:

$$H=(\beta *H_p+I_p)/(1+\beta)+0.5,$$

where:

p represents the current pixel;

$\beta$ is a calibration factor for the white space defect;

$H_p$ the historical state value for the current pixel p for the current scan line; and $I_p$ is the image value of the current pixel p.

4. The method of claim 1, wherein determining the compensated image value for the current pixel based on an historical state value for that pixel and a current image value of that pixel comprises determining the compensated image value as:

$$I_c = I_p - M_p \quad \text{for } 0 < I_p - M_p < I_m,$$
$$= 0 \quad \text{for } I_p - M_p < 0, \text{ and}$$
$$= I_m \quad \text{for } I_m < I_p - M_p,$$

where:

$I_c$ is the compensated image value;

p represents the current pixel;

$I_p$ is the current image value for the current pixel p of the current scan line;

$M_p$ is a modification value for the current pixel p; and $I_m$ is a maximum image value.

5. The method of claim 1, wherein determining the compensated image value for the current pixel based on an historical state value for that pixel and a current image value of that pixel comprises determining the compensated image value based on the current image value for the current pixel and a modification value for the current pixel.

6. The method of claim 1, further comprising:

determining a modification value for the current pixel; and determining the compensated image value for the current pixel based on an historical state value for that pixel and a current image value of that pixel comprises determining the compensated image value based on the current image value for the current pixel and the determined modification value for the current pixel.

7. The method of claim 6, wherein determining the modification value for the current pixel comprises determining the modification value for the current pixel as:

$$M_p = \propto C_p * (H_p - I_p) + 0.5,$$

where:

p represents the current pixel;

$M_p$ is the modification value for the current pixel p; and $\propto$ is a calibration factor for a magnitude of the white space defect;

$C_p$ is a modification factor based on an image magnitude of the current pixel p;

$H_p$ is the historical state value for the current pixel p; and $I_p$ is the image value for the current pixel p.

8. The method of claim 6, further comprising:

determining a modification factor for the current pixel; and determining the modification value for the current pixel comprises determining the modification value for the current pixel based on the historical state value for that pixel, the current image value of that pixel and the modification value for the current pixel.

9. The method of claim 8, wherein determining the modification factor for the current pixel comprises determining the modification factor for the current pixel as:

$$C_p = 1 - 4[(I_p/I_m) - 0.5)]^2,$$

where:

p represents the current pixel;

$C_p$ is the modification factor;

$I_p$ is the image value for the current pixel p; and $I_m$ is the maximum image intensity value of the input image data.

10. The method of claim 1, wherein performing steps (a)-(i) comprises:

performing steps (a)-(i) a first time using the input image data in a forward direction beginning with a portion of the image data to be printed nearest a leading edge of an image receiving substrate and continuing towards a portion of the image data to be printed nearest a trailing edge of the image receiving substrate to generate intermediate modified image data; and performing steps (a)-(i) a second time using the intermediate modified image data as the input image data in a reverse direction beginning with the portion of the image data to be printed nearest the trailing edge of an image receiving substrate and continuing towards the portion of the image data to be printed nearest the leading edge of the image receiving substrate to generate the modified image data.

* * * * *